March 16, 1926. 1,577,182

C. L. CULVER

MULTIPLE POWER GEARING

Filed March 9, 1925  2 Sheets-Sheet 1

INVENTOR
Charles L. Culver
BY
ATTORNEYS

March 16, 1926.                            1,577,182
C. L. CULVER
MULTIPLE POWER GEARING
Filed March 9, 1925          2 Sheets-Sheet 2

INVENTOR
Charles L. Culver
BY
H.L. & C. L. Reynolds
ATTORNEYS

Patented Mar. 16, 1926.

1,577,182

UNITED STATES PATENT OFFICE.

CHARLES L. CULVER, OF OLLALLA, WASHINGTON.

MULTIPLE POWER GEARING.

Application filed March 9, 1925. Serial No. 14,106.

*To all whom it may concern:*

Be it known that I, CHARLES L. CULVER, a citizen of the United States of America, and resident of the town of Ollalla, in Kitsap County, State of Washington, have invented certain new and useful Improvements in Multiple Power Gearings, of which the following is a specification.

My invention relates to means whereby power may be applied for variable rotation, and is particularly applicable for such purposes as turning of hoisting drums and blocks, although it will be evident that it may be put to numerous other uses where a variable rate of rotation and power is desired.

The object of my invention is to provide a simple and effective means for multiplying the power ratio and for varying the same, particularly in such apparatus as hoist blocks and drums, and such apparatus as require the use of a large power ratio.

The invention consists chiefly in the use for the drive mechanism of a drum, block or other rotative member, of two connected trains of sun-and-planet gears, and means for connecting the primary driving member of the device with different members of the gear trains.

The accompanying drawings illustrate my invention as applied to a hoist drum.

Figure 1:
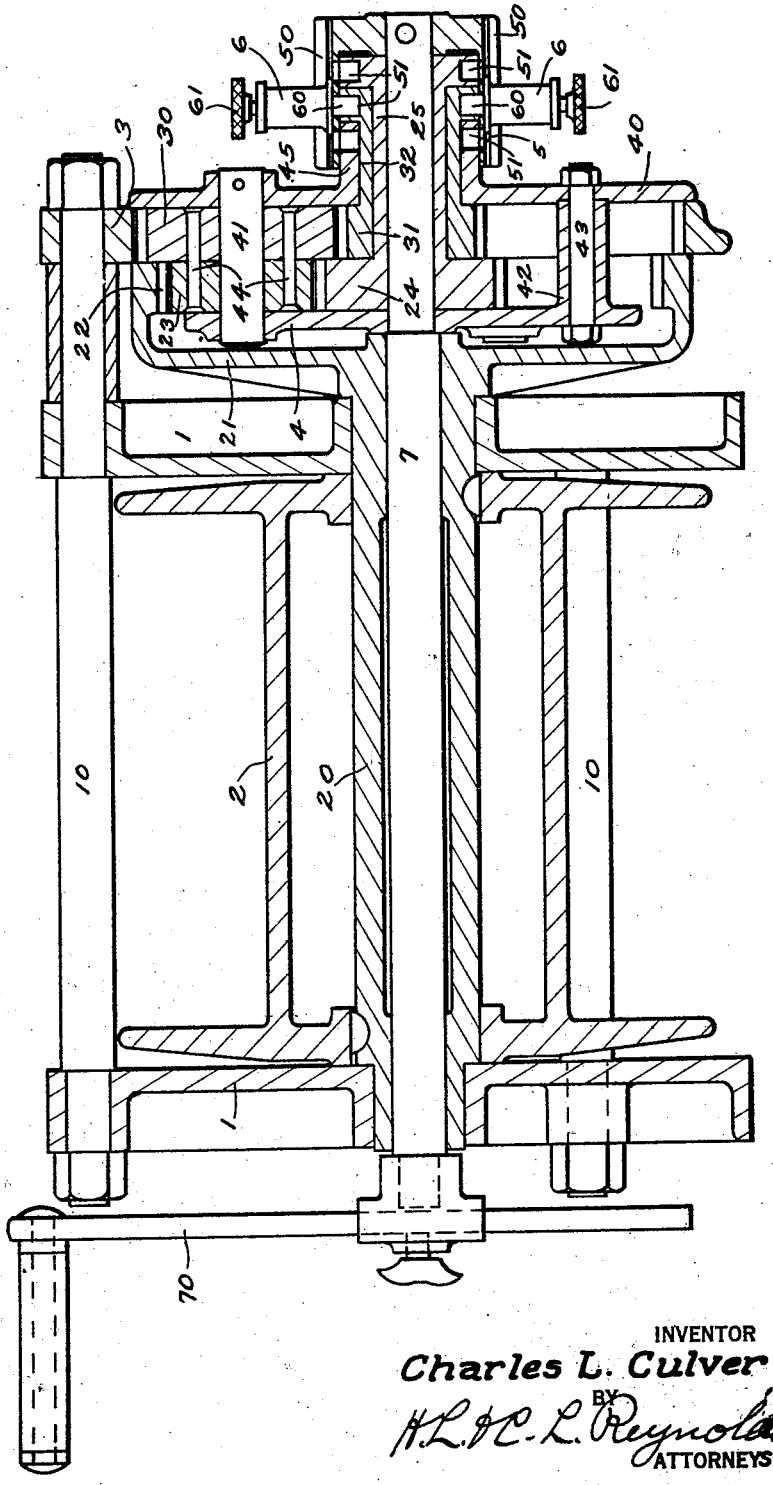
Figure 1 is a longitudinal section through the axial center of the device.

The particular mechanism illustrated in the drawings and hereinafter described has been chosen as typical of the purposes and uses for which my invention is adapted and as well illustrating the principles upon which it is based. It is, however, not to be understood as being the only use for which it is adapted. This mechanism comprises the following constructions.

A drum 2, which represents the final driven member, is mounted upon a shaft or journal 20 to which it is fixedly secured. These parts are journaled in a frame, which as shown consists of end frames 1 and connecting bars 10.

Upon one end of the shaft 20 is secured a disk or spider 21 which carries an orbit gear 22 of a planetary gear train. An orbit gear 3 of a second planetary gear train is fixed against turning, as by securing it to the frame. The planetary gear trains include planet gears 23 and 30 for the respective trains and sun gears 24 and 31. I have shown three planet gears in each train, although in theory other numbers may be used.

I employ a common planet carrier for both gear trains, this consisting of two disks 4 and 40 fixed together by studs or lugs 42 and bolts 43, and also connected by the journal pins 41 upon which the planet gears are mounted. Like planet gears of both trains are fixed together, as by bolts or pins 44, so that they must turn together.

The orbit gears 22 and 3 are of different diameters, as are also the planet gears 23 and 30 and the sun gears 24 and 31. As a result, the rate of turning of the drum is different when the drive is through one gear train than when the drive is through the other.

Each sun gear 24 and 31 has a sleeve 25 and 32, respectively, and the planet carrier has a sleeve 45, all three sleeves having terminal sections adjacent and of equal diameters and enclosed by a sleeve 5, which sleeve has a longitudinally extending slot or slots 50 in which is mounted to slide a block 6, having a locking pin 60 slidable therein radially of the sleeve, and controlled by a head 61 at the outer end thereof. These locking pins preferably are spring held in locking position. By shifting these pins the driving shaft 7, which is fixed to sleeve 5, may be connected to either sun gear or the planet carrier. The shaft 7 may be turned by hand, as by means of a crank 70 or through any suitable and available power drive.

Figure 2:
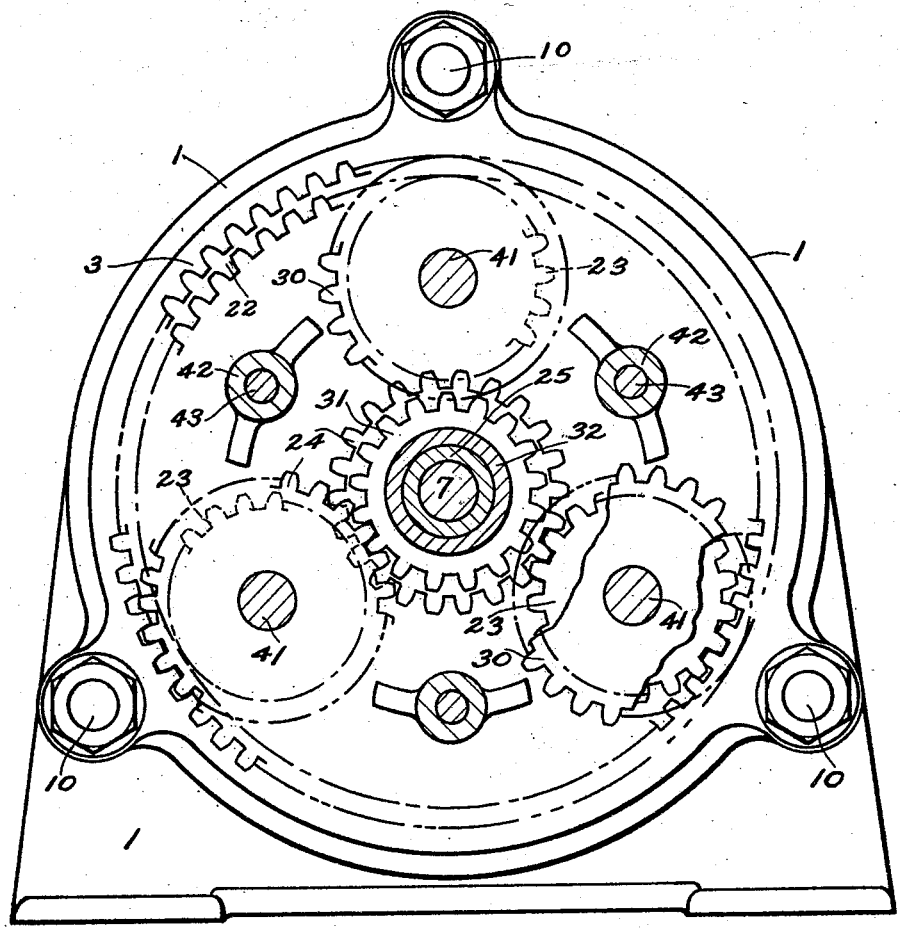
Figure 2 is a view of the planetary gear trains as seen from one side face.

If the driving shaft 7 is connected with the planet carrier and turned in a clockwise or right handed direction as the device is seen in Figure 2, the planet gears 23 and 30 will be carried in a like direction through their orbital path. As the orbit gear 3 is fixed, the planet gears will be turned in a left handed direction about their journals 41 while being bodily carried right handedly through their orbit.

The two planet gears 23 and 30 being fixed together, will be turned together in the same direction and rate. As the gear ratio between planet gear 23 and orbit gear 22 is greater than the gear ratio between planet gear 30 and orbit gear 3, it will require more turns of the planet gear 23 to complete the circuit of the orbit gear 22 than for the like gears 30 and 3 of the other train. In consequence the orbit gear 22 and the drum connected therewith will be right handedly turned an amount corresponding with the difference in speed ratio of the two gear trains. This will produce a great reduction of speed and an increase in power, the direction of turning of the drum 2 being the same as that of the shaft.

If the sun gear 31 be connected to turn with the shaft 7, right handed turning of the sun gear 31 will cause left handed turning of the planet gears 30 together with a right handed swing through their orbit, as the orbit gear is fixed. This orbital movement of the planet gears will be at a much slower rate than in the previously assumed condition. The action between the planet gear 23 and orbit gear 22 is the same as before explained. The result is a right handed turning of the orbit gear 22 at a rate compared with that of the orbital movement of the planet gears determined by the speed ratios of the two sets of gears.

If the sun gear 24 be connected with the driving shaft, the action is similar to that just above described, except that the difference in speed ratios between the two sets of gears will contribute a component tending to slightly increase the turning of the drum, whereas the same component in the preceding condition acted to decrease the speed of the drum.

The above device forms a compact mechanism of a type which is cheap to make and by reason of the great speed reduction produced thereby, is excellently adapted for any work where great power is desired. It secures three speeds but without any reversal of direction except by reversing the driving shaft. It is therefore well adapted for power hoists.

What I claim as my invention is:

1. A power drive comprising two planetary gear trains having different speed ratios, a common planet carrier for both trains, one orbit gear being fixed and the other movable, a concentric rotative driving member and means for securing said driving member to either sun gear.

2. A power drive comprising two planetary gear trains having different speed ratios, a common planet carrier for both trains, one orbit gear being fixed and the other movable, a concentric rotative driving member and means for securing said driving member to either sun gear or to the planet carrier.

3. In a hoist, a drum, an orbit gear fixed to turn with the drum, a second orbit gear held against turning, two sets of sun and planet gears operating each with its respective orbit gear, a common planet carrier for both sets of planet gears, and means for turning either sun gear.

4. In a hoist, a drum, two sun-and-planet gear trains of different gear ratios, one orbit gear being fixed to turn with the drum and the other held stationary, a planet carrier common to each train, the two sun gears and the planet carrier having each a sleeve, a driver, which sleeves and driver are concentrically nested, and means for securing the driver to any one of said sleeves.

5. In a hoist, a drum, two sun-and-planet gear trains of different gear ratios, one orbit gear being fixed to turn with the drum and the other held stationary, a planet carrier common to each train, and means for applying power to turn the drum through either sun gear or the planet carrier at will.

6. In a hoist, a drum, a shaft upon which the drum may freely turn, two sun-and-planet gear trains, the orbit gear of one train being connected to turn with the drum, a frame to which the orbit gear of the other train is fixed, a planet carrier common to both trains, the sun gears of both trains and the planet carrier having concentric sleeves having exposed ends, a driving sleeve secured to the shaft and extending over the sleeves carried by the gear-train members, and a dog adapted to lock the driving sleeve to either of the other sleeves.

Signed at Seattle, King County, Washington, this 2nd day of March, 1925.

CHARLES L. CULVER.